(12) United States Patent  
Fehn et al.

(10) Patent No.: US 7,119,159 B2
(45) Date of Patent: Oct. 10, 2006

(54) SELF-ADHESIVE ADDITION-CROSSLINKING SILICON COMPOSITIONS

(75) Inventors: Armin Fehn, Mehring (DE); Philipp Mueller, Burghausen (DE); Christine Leitermann, Burghausen (DE); Robert Mesnaritsch, Neuötting (DE)

(73) Assignee: Wacker-Chemie GmbH, Munich (DE)

( * ) Notice: Subject to any disclaimer, the term of this patent is extended or adjusted under 35 U.S.C. 154(b) by 190 days.

(21) Appl. No.: 10/456,710

(22) Filed: Jun. 6, 2003

(65) Prior Publication Data

US 2003/0236380 A1    Dec. 25, 2003

(30) Foreign Application Priority Data

Jun. 14, 2002  (DE) .............................. 102 26 626

(51) Int. Cl.
    C08G 77/08      (2006.01)
(52) U.S. Cl. .............................. 528/15; 528/31; 528/25
(58) Field of Classification Search .................. 528/15, 528/25, 31
    See application file for complete search history.

(56) References Cited

U.S. PATENT DOCUMENTS

| 4,203,913 | A |   | 5/1980  | Burkhardt et al. |         |
|-----------|---|---|---------|------------------|---------|
| 4,786,702 | A | * | 11/1988 | Sam et al.       | 528/15  |
| 5,312,855 | A |   | 5/1994  | Okami            |         |
| 5,438,094 | A | * | 8/1995  | Fujiki et al.    | 524/730 |
| 5,989,704 | A | * | 11/1999 | Hashimoto et al. | 428/331 |
| 6,743,515 | B1| * | 6/2004  | Muller et al.    | 428/447 |

FOREIGN PATENT DOCUMENTS

| EP | 0 686 671 |   | 12/1995 |
|----|-----------|---|---------|
| EP | 1 035 162 |   | 9/2000  |
| EP | 1 106 662 | * | 6/2001  |

OTHER PUBLICATIONS

English abstract EP 1 106 662, Jun. 2001.*
Sorrell, T.N., Yuan, H.G., Org. Chem. 62 (1997), pp. 1899-1902.
Ergozhin et al., "Properties of Macromolecules with Weakly Acid Carboxyl Groups," Translated from Izv. Akad. Nauk SSSR Ser. Khim. 24, (1975), p. 1851 (pp. 1733-1735).

* cited by examiner

Primary Examiner—Margaret G. Moore
(74) Attorney, Agent, or Firm—Brooks Kushman P.C.

(57) ABSTRACT

Addition-crosslinking silicone compositions comprise
(A) diorganopolysiloxanes

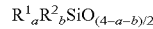

wherein
  $R^1$ is hydroxyl or a monovalent $C_{1-20}$ hydrocarbon radical free of aliphatic unsaturation,
  $R^2$ is a monovalent aliphatically unsaturated $C_{1-10}$ hydrocarbon radical,
  a has a value from 1.0 to 2.0,
  b is 0.0003 to 2, and 1.5<(a+b)<3.0,
(B) organohydropolysiloxanes

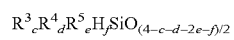

$R^3$ is a monovalent aliphatically saturated $C_{1-20}$ hydrocarbon radical,
  $R^4$ is (a) an optionally halogen-substituted monovalent $C_{6-15}$ hydrocarbon radical containing at least one aromatic $C_6$ ring, or (b) a halogen-substituted, saturated monovalent $C_{2-20}$ hydrocarbon radical,
  $R^5$ is a bivalent $C_{6-20}$ hydrocarbon radical Si-bonded at both ends, and
  c, d, e and f is zero or a positive number,
(C) adhesion promoters

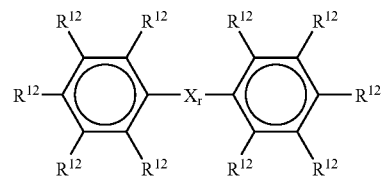
(6)

in which $R^{12}$ is a hydrogen atom, a hydroxyl group, a halogen atom, or organic radical,
and X is
—($R^{13}$—)C(—$R^{13}$)—, —(O=)S(=O)—, —(O=)S—, —C(=O)—, —O—($CH_3$—)Si(—$CH_3$)—O—, —($CH_2$)$_s$— or —O—
wherein $R^{13}$ is hydrogen, halogen, or optionally substituted alkyl, aryl, alkenyl or alkynyl, and s is at least 2, and
(D) a hydrosilylation catalyst.

11 Claims, No Drawings

SELF-ADHESIVE ADDITION-CROSSLINKING SILICON COMPOSITIONS

BACKGROUND OF THE INVENTION

1. Field of the Invention

The invention relates to self-adhesive addition-crosslinking silicone compositions, to addition-crosslinked silicone elastomers and to processes for preparing them.

2. Background Art

U.S. Pat. No. 5,438,094 describes self-adhesive addition-crosslinking silicone compositions comprising as crosslinkers very specific organohydropolysiloxanes (B) and as adhesion promoters (C) special compounds having at least one aliphatic unsaturated group and two phenylene residues per molecule. Organohydrosiloxanes (B) claimed are those of the formula (1), (2) or (3): $R_3Si(O\text{—}SiHR)_nOSiR_3$ (1); cyclic $(OSiHR)_n$ (2); and $R_{4-m}Si(OSiHR_2)_m$ (3). In these formulae, each R is a substituted or unsubstituted monovalent hydrocarbon group, m is 3 or 4 and n is an integer of at least 3. The patent conversely describes organopolysiloxane components of the structure:

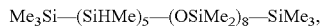

Me$_3$Si—(SiHMe)$_5$—(OSiMe$_2$)$_8$—SiMe$_3$, as not suitable for use.

With known self-adhesive addition-crosslinking silicone compositions, the adhesion, particularly to diverse plastics, is not optimal. There is therefore a need to provide new self-adhesive addition-crosslinking silicone compositions featuring improved adhesion.

SUMMARY OF THE INVENTION

It is an object of the invention to overcome the drawbacks of the prior art and in particular to enhance adhesion to various plastics and metals. This and other objects are achieved through the use of unique crosslinkers containing both silicon bonded hydrogen and aromatic groups, in combination with alkenyl-functional bis(aryl) compounds.

DETAILED DESCRIPTION OF THE PREFERRED EMBODIMENTS

The invention provides addition-crosslinking silicone compositions comprising (A) diorganopolysiloxanes of the general formula (1)

$$R^1_aR^2_bSiO_{(4-a-b)/2} \quad (1),$$

in which $R^1$ is a hydroxyl radical or a monovalent, optionally halogen-substituted $C_{1-20}$ hydrocarbon radical optionally containing O, N, S or P atoms, and free of aliphatically unsaturated groups, $R^2$ is a monovalent, aliphatically unsaturated, optionally halogen-substituted $C_{1-10}$ hydrocarbon radical optionally containing O, N, S or P atoms, a has a value from 1.0 to 2.0, b has a value from 0.0003 to 2, with the proviso that 1.5 < (a+b) < 3.0, that on average at least two aliphatically unsaturated radicals $R^2$ are present per molecule, and that the viscosity of the diorganopolysiloxanes (A) determined at 25° C. is 1 mPa·s to 40,000 Pa·s, (B) organohydropolysiloxanes of the general formula (2)

$$R^3_cR^4_dR^5_eH_fSiO_{(4-c-d-2e-f)/2} \quad (2),$$

in which $R^3$ is a monovalent aliphatically saturated $C_{1-20}$ hydrocarbon radical, $R^4$ is (a) an optionally halogen-substituted monovalent $C_{6-15}$ hydrocarbon radical which contains at least one aromatic $C_6$ ring, or (b) a halogen-substituted, saturated monovalent $C_{2-20}$ hydrocarbon radical optionally containing O, N, S or P atoms, $R^5$ is a bivalent, optionally halogen-substituted $C_{6-20}$ hydrocarbon radical Si-bonded at both ends, optionally containing O, N, S or P atoms, c, d, e and f denote zero and positive numbers, with the proviso that the organohydropolysiloxane (B) contains on average at least 3 SiH groups per molecule, that the relationship: 0.05<100 (d+e)/(c+d+e+f) is fulfilled, and that the viscosity of the organohydropolysiloxane (B) determined at 25° C. is 1 mPa·s to 100 Pa·s, (C) adhesion promoters

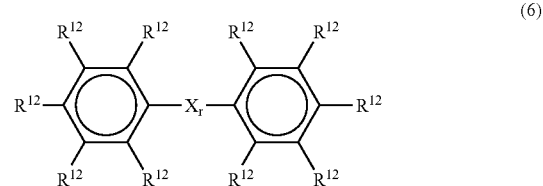

(6)

in which $R^{12}$ is a hydrogen atom, a hydroxyl group, a halogen atom, an alkyl, alkenyl, alkoxy, alkenyloxy or aryl group or a monovalent organic group containing an alkenyl, alkoxy, glycidyl, carbonyl, carbonyloxy, silyloxy or alkoxysilyl group, at least one of the radicals $R^{12}$ being an alkenyl group or a monovalent organic group containing an alkenyl group, and X is selected from the following groups:

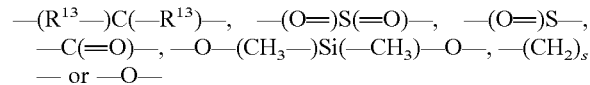

—(R$^{13}$—)C(—R$^{13}$)—, —(O═)S(═O)—, —(O═)S—, —C(═O)—, —O—(CH$_3$—)Si(—CH$_3$)—O—, —(CH$_2$)$_s$— or —O— in which $R^{13}$ is a hydrogen atom, a halogen atom or a substituted or unsubstituted alkyl, aryl, alkenyl or alkynyl group and s is a positive number of at least 2, preferably 2 to 4, and r is 0 or 1, and (D) a hydrosilylation catalyst.

Organohydropolysiloxane (B) acts as an adhesion promoter and simultaneously as a crosslinking agent.

Component (C) is a compound having at least one aliphatic unsaturated group and two phenyl skeletons per molecule. This compound is an essential tackifier component, which interacts with components (A) and (B) in such a way that the composition becomes tacky. The compounds have aliphatic unsaturated groups, such as alkenyl groups, and p-phenylene skeletons and correspond to the following general formula (6), preferably to the following general formula (7).

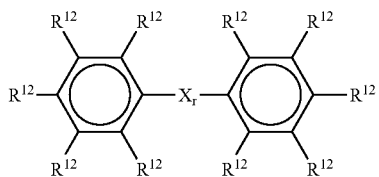
(6)

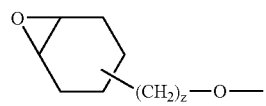
(5)

in which z is an integer from 1 to 6.

In formula (6) $R^{12}$ is a hydrogen atom, a hydroxyl group, a halogen atom, an alkyl, alkenyl, alkoxy, alkenyloxy or aryl group or a monovalent organic group containing an alkenyl, alkoxy, glycidyl, carbonyl, carbonyloxy, silyloxy or alkoxysilyl group. At least one, preferably 1 to 4, of the radicals $R^{12}$ is/are alkenyl group(s) or alkenyl-group-containing monovalent organic groups.

X is selected from the following groups:
—($R^{13}$—)C(—$R^{13}$)—, —(O=)S(=O)—, —(O=)S—, —C(=O)—, —O—(CH₃—)Si(—CH₃)—O—, —(CH₂)$_s$— and —O— where $R^{13}$ is a hydrogen atom, a halogen atom or a substituted or unsubstituted alkyl, aryl, alkenyl or alkynyl group and s is a positive number of at least 2, preferably 2 to 4. The subscript r is 0 or 1.

In $R^{12}$ and $R^{13}$ the alkyl and alkoxy groups should preferably have 1 to 10 carbon atoms, more preferably 1 to 8 carbon atoms, in particular 1 to 6 carbon atoms. The aryl group should have preferably 6 to 10 carbon atoms, more preferably 6 to 8 carbon atoms. The alkenyl, alkynyl and alkenyloxy groups should have preferably 2 to 10 carbon atoms, preferably 2 to 8 carbon atoms, in particular 2 to 6 carbon atoms. The monovalent organic group should have preferably 1 to 12 carbon atoms, more preferably 2 to 10 carbon atoms, in particular 2 to 8 carbon atoms.

Examples of the alkyl, alkenyl and aryl groups are alkyl groups such as methyl, ethyl, propyl, isopropyl, butyl tert-butyl, hexyl, cyclohexyl and octyl; alkenyl groups such as vinyl, allyl, propenyl, isopropenyl, butenyl, hexenyl, and cyclohexenyl; aryl groups such as phenyl, tolyl, and xylyl; and aralkyl groups such as benzyl and phenylethyl. An example of an alkynyl group is the acetylene group. Examples of alkoxy groups and the alkenyloxy groups include methoxy, ethoxy, propoxy, isopropoxy, butoxy, tert-butoxy, methoxyethoxy, ethoxyethoxy, vinyloxy, allyloxy, propenoxy, isopropenoxy, butenoxy, etc.

Examples of monovalent organic groups containing an alkenyl, alkoxy, glycidyl, carbonyl, carbonyloxy, silyloxy or alkoxysilyl group include the following groups:
CH₂=C(—R')—C(=O)—O—
in which R' is a hydrogen atom or a methyl group,
(R"O)$_x$Si(—R"$_{3-x}$)—(CH₂)$_y$—O—
in which R" is a monovalent hydrocarbon group having 1 to 6 carbon atoms, such as an alkyl group, an alkenyl group and an aryl group, x is 1, 2 or 3 and y is an integer from 0 to 6,

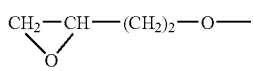

in which z is an integer from 1 to 6, and

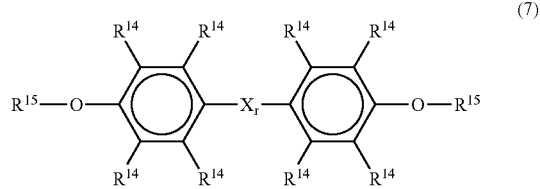

(7)

$R^{14}$ in formula (7) may be hydrogen, hydroxyl, halogen, alkyl groups having 1 to 10 carbon atoms, preferably 1 to 8 carbon atoms, more preferably 1 to 6 carbon atoms, or alkenyl groups having 2 to 10 carbon atoms, preferably 2 to 8 carbon atoms, more preferably 2 to 6 carbon atoms. $R^{15}$ may be an alkenyl group having 2 to 12, preferably 2 to 10, carbon atoms, a monovalent organic group containing an alkenyl group having 2 to 12, preferably 2 to 10, carbon atoms, —$R^{16}$$_t$—Si$R^{17}$ or —CO—$R^{17}$. $R^{16}$ is an alkylene group having 1 to 6 carbon atoms, preferably 1 to 4 carbon atoms. The subscript t=0 or 1. $R^{17}$ is an alkyl group having 1 to 6 carbon atoms, an alkenyl group having 2 to 6 carbon atoms or an alkoxy group having 1 to 6 carbon atoms.

One or two of the radicals $R^{15}$ must be an alkenyl group or a monovalent organic group containing an alkenyl group. X and r are as defined above.

Examples of the alkyl group, alkenyl group and the monovalent organic group containing an alkenyl group are the same as specified for $R^{12}$. Examples of the alkylene group incle the methylene, ethylene, trimethylene, tetramethylene, hexamethylene and methylethylene group. Examples are set forth below.

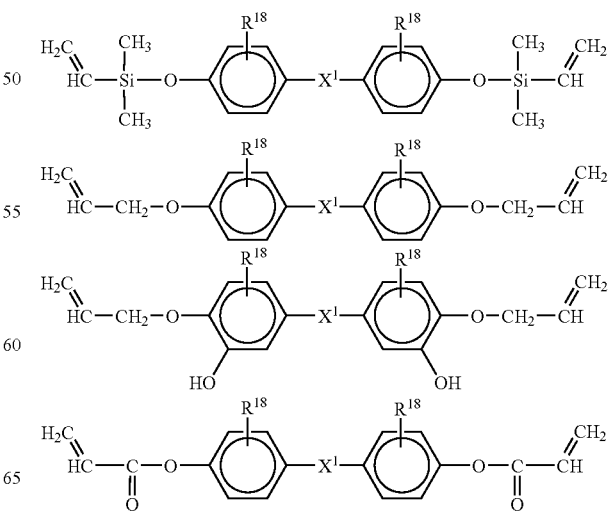

-continued

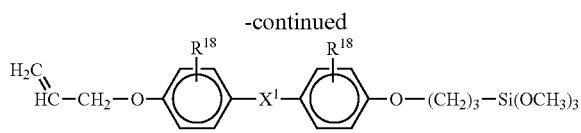

In the formula, $X^1$ —O—, —$CH_2$—, —($CH_3$—)C(—$CH_3$), —O—($CH_3$—)Si($CH_3$)—O—, and R is a hydrogen atom, a vinyl group or an allyl group.

Components (A), (B) and (C) may each comprise a single compound or any desired mixtures of different compounds of the respective component.

Examples of the radicals $R^1$ are alkyl radicals such as the methyl, ethyl, propyl, isopropyl, tert-butyl, n-pentyl, isopentyl, neopentyl, tert-pentyl, n-octyl, 2-ethylhexyl, 2,2,4-trimethylpentyl, n-nonyl and octadecyl radicals; cycloalkyl radicals such as the cyclopentyl, cyclohexyl, cycloheptyl, norbornyl, adamantylethyl or bornyl radicals; aryl or alkaryl radicals such as the phenyl, ethylphenyl, tolyl, xylyl, mesityl and naphthyl radicals; and aralkyl radicals such as the benzyl, 2-phenylpropyl or phenylethyl radicals, and those derivatives of the above radicals which are halogenated and/or functionalized with organic groups such as the 3,3,3-trifluoropropyl, 3-iodopropyl, 3-isocyanatopropyl, aminopropyl, methacryloyloxymethyl, or cyanoethyl radicals. Preferred radicals $R^1$ contain 1 to 10 carbon atoms and optionally halogen substituents. Particularly preferred radicals $R^1$ are the methyl, phenyl and 3,3,3-trifluoropropyl radical, in particular the methyl radical.

The radicals $R^2$ are amenable to a hydrosilylation reaction. Examples of these are alkenyl and alkynyl radicals, such as the vinyl, allyl, isopropenyl, 3-butenyl, 2,4-pentadienyl, butadienyl, 5-hexenyl, undecenyl, ethynyl, propynyl and hexynyl radicals; cycloalkenyl radicals, such as the cyclopentenyl, cyclohexenyl, 3-cyclohexenylethyl, 5-bicycloheptenyl, norbornenyl, 4-cyclooctenyl and cyclooctadienyl radicals; alkenylaryl radicals, such as the styryl or styrylethyl radicals, and those derivatives of the above radicals which are halogenated and contain heteroatoms, such as the 2-bromovinyl, 3-bromo-1-propynyl, 1-chloro-2-methylallyl, 2-(chloromethyl)allyl, styryloxy, allyloxypropyl, 1-methoxyvinyl, cyclopentenyloxy, 3-cyclohexenyloxy, acryloyl, acryloyloxy, methacryloyl and methacryloyloxy radicals. Preferred radicals $R^2$ are the vinyl, allyl and 5-hexenyl radicals, in particular the vinyl radical.

In the case of the diorganopolysiloxanes (A) of the general formula (1), the viscosity determined at 25° C. is preferably 100 mPa·s to 30,000 Pa·s. With particular preference, the viscosity range is from 1 to 30,000 Pa·s. Depending on the type of the addition-crosslinking material, different viscosity ranges are particularly preferred. Viscosities from 100 to 10,000 mPa·s are particularly preferred for the materials known as RTV-2 (room temperature vulcanizing), from 1 to 100 Pa·s for LSR (liquid silicone rubber) and from 2000 to 40,000 Pa·s for HTV (high temperature vulcanizing).

Examples of $R^3$ are alkyl radical, such as the methyl, ethyl, propyl, isopropyl, tert-butyl, n-octyl, 2-ethylhexyl and octadecyl radical, and cycloalkyl radicals such as the cyclopentyl, cyclohexyl, norbornyl and bornyl radicals. Preferred radicals $R^3$ are hydrocarbon radicals having 1 to 10 carbon atoms. A particularly preferred radical $R^3$ is the methyl radical.

Examples of $R^4$ (a) are the phenyl, tolyl, xylyl, biphenylyl, anthryl, indenyl, phenanthryl, naphthyl, benzyl, phenylethyl and phenylpropyl radicals, and those derivatives of the above radicals which are halogenated and functionalized with organic groups, such as o-, m- or p-chlorophenyl, pentafluorophenyl, bromotolyl, trifluorotolyl, phenoxy, benzyloxy, benzyloxyethyl, benzoyl, benzoyl-oxy, p-tert-butylphenoxypropyl, 4-nitrophenyl, quinolinyl and pentafluorobenzoyloxy radicals.

Examples of hydrocarbon radicals $R^4$ (b) having 2 to 20 carbon atoms include the 3-chloropropyl, 3-bromopropyl, 3,3,3-trifluoropropyl, 2-fluoroethyl, 1,1-dihydroperfluorododecyl and 2-cyanoethyl radicals. Particularly preferred radicals $R^4$ are the phenyl radical and the 3,3,3-trifluoropropyl radical. Preferred radicals $R^5$ correspond to the general formula (4)

$$—(O)_s—(R^6)_t—(O)_u—(X)_w—(O)_u—(R^6)_t—(O)_s— \qquad (4)$$

in which s, t, u and w, independently of one another, denote the values 0, 1 or 2, $R^6$ may be identical or different and denote a bivalent, optionally halogen-substituted $C_{1-10}$ hydrocarbon radical which optionally contains O, N, S or P atoms, and is free of aliphatically unsaturated groups, such as —$CH_2$—, —$CH_2$—$CH_2$—, —$CH_2$—$CH_2$—$CH_2$—, —$CF_2$—, —$CH_2$—$CF_2$—, —$CH_2$—$CH(CH_3)$—, —$C(CH_3)_2$—, —$CH_2$—$C(CH_3)_2$—, —$C(CH_3)_2$—$CH_2$—, —$CH_2$—$CH_2$—O— or —$CF_2$—$CF_2$—O—, —(X)— denotes a bivalent radical, such as —Ph—, —Ph—O—Ph—, —Ph—S—Ph—, —Ph—$SO_2$—Ph—, —Ph—$CH_2$—Ph—, —Ph—$C(CH_3)_2$—Ph—, —Ph—$C(CF_3)_2$—Ph—, —Ph—C(O)—Ph—, cyclohexylene or norbornylene, —Ph— designating a phenylene group, and wherein oxygen atoms in the formula (4) are non-adjacent.

A particularly preferred radical $R^5$ is the phenylene radical.

The organohydropolysiloxane (B) preferably contains 5 to 40 SiH groups per molecule. The viscosity of the component (B) measured at 25° C. is preferably 2 mP·s to 1 Pa·s.

Owing to the labile nature of the SiH group, the component (B) may have a low content, typically <100 ppm by weight, of Si-bonded OH groups, arising from the preparation.

For 100 parts by weight of diorganopolysiloxanes (A) it is preferred to use 0.1 to 50 parts by weight, in particular 0.5 to 10 parts by weight, of organohydropolysiloxanes (B) and 0.1 to 15 parts by weight, in particular 0.5 to 7 parts by weight, of (C).

Hydrosilylation catalyst (D) serves as a catalyst for the addition reaction, between the aliphatically unsaturated hydrocarbon radicals $R^2$ of the diorganopolysiloxanes (A) and the silicon-bonded hydrogen atoms of the organohydropolysiloxanes (B) commonly termed hydrosilylation. Numerous suitable hydrosilylation catalysts are described in the literature. In principle, all hydrosilylation catalysts corresponding to the prior art and used in addition-crosslinking silicone rubber materials can be used.

Metals and their compounds, for example as platinum, rhodium, palladium, ruthenium and iridium, preferably platinum, can be used as hydrosilylation catalyst (D). The metals can optionally be fixed on finely divided support materials, such as active carbon, or on metal oxides such as alumina, or silica. Platinum and platinum compounds are preferably used. Particularly preferred platinum compounds are those which are soluble in polyorganosiloxanes. The soluble platinum compounds may be, for example, the platinum-olefin complexes of the formulae $(PtCl_2.olefin)_2$ and H(PtCl$_3$.olefin), the olefins having 2 to 8 carbon atoms, such as ethylene, propylene, isomers of butene and of octene, or cycloalkenes having 5 to 7 carbon atoms, such as cyclopentene, cyclohexene and cycloheptene, preferably being used. Further soluble platinum catalysts are the platinum-cyclopropane complexes of the formula (PtCl$_2$C$_3$H$_6$)$_2$, the reaction products of hexachloroplatinic acid with alcohols, ethers and aldehydes and mixtures thereof or the reaction product of hexachloroplatinic acid with methylvinylcyclotetrasiloxane in the presence of sodium bicarbonate in ethanolic solution. Platinum catalysts with phosphorous, sulfur and amine ligands may also be used, e.g., (Ph$_3$P)$_2$PtCl$_2$. Complexes of platinum with vinylsiloxanes, such as sym-divinyltetramethyldisiloxane, are particularly preferred.

The amount of hydrosilylation catalyst (D) used depends on the desired crosslinking rate and on economic aspects. In most cases, it is preferable to use $1\times10^{-5}$ to $5\times10^{-2}$ part by weight, in particular $1\times10^{-4}$ to $1\times10^{-2}$ part by weight, of platinum catalysts, calculated as platinum metal, per 100 parts by weight of diorganopolysiloxanes (A).

The self-adhesive addition-crosslinking silicone compositions can optionally contain further components (E), such as fillers, inhibitors, stabilizers, pigments and catalysts.

In order to achieve a sufficiently high mechanical strength of the crosslinked silicone rubber, it is preferable to incorporate actively reinforcing fillers as component (F) into the addition-crosslinking silicone compositions. The actively reinforcing fillers (F) used are, in particular, precipitated and pyrogenic silicas and mixtures thereof. The specific surface area of these actively reinforcing fillers should be at least 50 m$^2$/g or preferably in the range from 100 to 400 m$^2$/g determined by the BET method. Such actively reinforcing fillers are very well-known materials in the field of silicone rubbers. The silica fillers may be hydrophilic in nature or may have been hydrophobicized by known methods. When hydrophilic fillers are employed, it is generally necessary to add a hydrophobicizing agent.

The amount of actively reinforcing filler (F) in the crosslinkable material generally lies in the range from 0 to 70% by weight, preferably 0 to 50% by weight.

The silicone rubber material according to the invention may optionally include as component (G) further additives in amounts up to 70% by weight, preferably 0.0001 to 40% by weight. These additives may be, for example, inert fillers, resinous polyorganosiloxanes, dispersing assistants, solvents, adhesion promoters, pigments, dyes, plasticizers, organic polymers, heat stabilizers, etc. These include additives such as activated carbon, ground quartz, diatomaceous earth, clays, chalk, lithopones, carbon blacks, graphite, metal oxides, metal carbonates, metal sulfates, metal salts of carboxylic acids, metal dusts, fibers such as glass fibers, and polymers fibers, polymer powders, dyes, pigments, etc.

Additionally present may be additives (H), which serve to set the processing time, onset temperature and crosslinking rate of the curable materials. These inhibitors and stabilizers are very well known in the field of addition-crosslinking materials. Examples of customary inhibitors are acetylenic alcohols, such as 1-ethynyl-1-cyclohexanol, 2-methyl-3-butyn-2-ol and 3,5-dimethyl-1-hexyn-3-ol, 3-methyl-1-dodecyn-3-ol, polymethylvinylcyclosiloxanes, such as 1,3,5,7-tetravinyltetramethyltetracyclosiloxane, low molecular weight silicone oils containing methylvinylSiO$_{2/2}$ groups and/or R$_2$vinylSiO$_{1/2}$ end groups, such as divinyltetramethyldisiloxane, tetravinyldimethyldisiloxane, trialkyl cyanurates, maleates such as diallyl maleate, dimethyl maleate and diethyl maleate, fumarates such as diallyl fumarate and diethyl fumarate, organic hydroperoxides such as cumene hydroperoxide, tert-butyl hydroperoxide and pinane hydroperoxide, organic peroxides, organic sulfoxides, organic amines, diamines and amides, phosphanes and phosphites, nitriles, triazoles, diaziridines and oximes. The activity of these inhibitor additives (H) depends on their chemical structure, and so must be determined individually by routine methods.

The inhibitor content of the materials according to the invention is preferably 0 to 50,000 ppm, more preferably 20 to 2000 ppm, and in particular, 100 to 1000 ppm.

Optionally it is possible to add further components (I) which are employed in conventional self-adhesive addition-crosslinking silicone rubber materials. These are preferably organopolysiloxane compounds. Even more preferable are cyclic or linear organopolysiloxane compounds having at least one SiH group and at least one alkoxysilyl and/or glycidyl group per molecule. Such compounds are described, for example, in U.S. Pat. No. 5,312,855, especially column 4, line 25 to column 5, line 23 (adhesion imparting agent (D)), incorporated herein by reference. Also suitable are organosilicon compounds containing epoxy groups and hydrolyzable groups, of the general formula (3)

and/or their partial hydrolysates, in which
R$^7$ is hydrogen, a hydroxyl radical, or an optionally halogen- or cyano-substituted, saturated monovalent C$_{1-20}$ hydrocarbon radical optionally containing O, N, S or P atoms,
R$^8$ is an optionally halogen-substituted monovalent C$_{2-20}$ hydrocarbon radical containing at least one epoxy group, optionally containing O, N, S or P atoms,
R$^9$ is a hydrolyzable, monovalent, optionally halogen-substituted C$_{1-20}$ hydrocarbon radical bonded to Si via an Si—O—C—, Si—O—N— or Si—N— link, optionally containing O, N, S or P atoms,
with the proviso that $4>g\geq0$, $4>h>0$, $4>i>0$, $4\geq(h+i)>0$ and $4>(g+h+i)$.

Examples of hydrocarbon radicals R$^7$ are alkyl radicals such as the methyl, ethyl, n-propyl, isopropyl, tert-butyl, n-pentyl, isopentyl, neopentyl, tert-pentyl, n-octyl, 2-ethylhexyl, 2,2,4-trimethylpentyl, n-nonyl and octadecyl radicals; cycloalkyl radicals such as the cyclopentyl, cyclohexyl, cycloheptyl, norbornyl, adamantylethyl and bornyl radicals; aryl radicals such as the phenyl, ethylphenyl, tolyl, xylyl, mesityl and naphthyl radicals; aralkyl radicals such as the benzyl, phenylethyl and phenylpropyl radicals; alkenyl and alkynyl radicals such as the vinyl, allyl, isopropenyl, 3-butenyl, 2,4-pentadienyl, butadienyl, 5-hexenyl, undecenyl, ethynyl, propynyl and hexynyl radicals; cycloalkenyl radicals such as the cyclopentenyl, cyclohexenyl, 3-cyclohexenylethyl, 5-bicycloheptenyl, norbornenyl, 4-cyclooctenyl and cyclooctadienyl radicals; aralkenyl radicals such as the phenylethenyl and phenylethynyl radicals; and those derivatives of the above radicals which are halogen-substituted or contain heteroatoms, such as the 3-chloropropyl, 3-bromopropyl, decafluoro-1,1,2,2-tetrahydrooctyl, (p-chloromethyl)phenyl, (p-chloromethyl)phenethyl, hydroxymethyl, hydroxyethyl, hydroxypropyl, hydroxybutyl, 2-bromovinyl, 2-allyloxymethyl, acetyl, acetoxy-methyl, acetoxyethyl, acetoxypropyl, 3-phenoxypropyl, benzoyloxypropyl, mercaptopropyl, cyanoethyl, cyanopropyl, 3-cyanobutyl, 3-isocyanatopropyl, 2-(carbomethoxy)ethyl, 10-(carbomethoxy) decyl, 2-(carboxymethylthio)ethyl, 3-carboxypropyl, aminomethyl, aminoethyl, aminopropyl, aminohexyl, aminoethylaminopropyl, 3—(N-allylamino)propyl, (aminoethylaminomethyl)phenethyl, m-aminophenyl, 3—(m-aminophenoxy)propyl, 3-acryloyloxypropyl, 3-acryloyloxy-2-hydroxypropyl, 4—(acryloyloxymethyl)-phenethyl, methacryloyloxymethyl, methacryloyloxyethyl and methacryloyloxypropyl radicals. Preferred radicals $R^7$ are the methyl, ethyl, propyl, butyl, octyl, vinyl, allyl, phenyl, 3,3,3-trifluoropropyl and cyanopropyl radicals. Particularly preferred radicals $R^7$ are the methyl, vinyl and phenyl radicals.

Examples of the radicals $R^8$ are the epoxyethyl, 2,3-epoxypropyl, 3,4-epoxybutyl, 5,6-epoxyhexyl, 9,10-epoxydecyl, glycidyloxy, 3-glycidyloxypropyl, glycidyloxyisobutyl, 2-methylglycidyloxypropyl, 3-phenylglycidyloxypropyl, glycidyloxyphenylnonyl, glycidyloxybenzylethyl, 3,4-epoxycyclohexyl, 2-(3,4-epoxycyclohexyl)ethyl, 3—(3,4-epoxycyclohexyl)propyl, 1,4-epoxycyclohexyl and 2—(1,4-epoxycyclohexyl)ethyl radicals. Preferred radicals $R^8$ are the 3,4-epoxycyclohexyl, 3—(3,4-epoxycyclohexyl)propyl and glycidyloxypropyl radicals. $R^8$ preferably has 2 to 10 carbon atoms. The particularly preferred radical $R^8$ is the glycidyloxypropyl radical.

$R^9$ denotes a hydrolyzable monovalent optionally halogen-substituted $C_{1-20}$ hydrocarbon radical which is bonded to Si via an Si—O—C—, Si—O—N— or Si—N— linkage, and optionally contains O, N, S or P atoms.

Examples of the radicals $R^9$ are a) alkoxy, enoxy or aryloxy groups of the general formula —$OR^{10}$, such as the methoxy, ethoxy, n-propoxy, isopropoxy, n-butoxy, sec-butoxy, tert-butoxy, 2-ethylbutoxy, 2-ethylhexyloxy, vinyloxy, allyloxy, isopropenyloxy, cyclobutenyloxy, cyclohexenyloxy, 1,3-butadienyloxy, propargyloxy, phenoxy, benzyloxy or m- and p-vinylbenzyloxy radicals;

b) acyloxy groups of the general formula —$OCOR^{10}$, such as the formyloxy, acetoxy, 2-ethylhexanoyloxy, acryloyloxy, methacryloyloxy, benzoyloxy and norbornylacetoxy radicals;

c) amino groups of the general formula —$NH_2$, —$NHR^{10}$ or —$NHR^{10}_2$, such as the dimethylamino, diisopropylamino, allylamino, n-butylamino, sec-butylamino and cyclohexylamino radicals;

d) oxime groups of the general formula —$ON=CH_2$, —$ON=CHR^{10}$ or —$ON=CR^{10}_2$, such as the methyl ethyl ketoxime, methyl isobutyl ketoxime, methyl n-amylketoxime and dimethyl ketoxime radicals;

e) amido groups of the general formula —NH—C(=O)—$R^{10}$ or —$NR^{10}$—C(=O)—$R^{10}$, such as the N-methylbenzamido and N-methylacetamido radicals;

f) aminoxy groups of the general formula —$ONH_2$, —$ONHR^{10}$ or —$ONR^{10}_2$, such as the hydroxylamino radical; or g) those derivatives of the abovementioned radicals which are halogen-substituted or contain heteroatoms or have a relatively complex composition, such as the p-aminophenoxy, 2-methoxyethoxy, 1-methoxy-2-propoxy, 1-methoxyisopropenyloxy, methoxyethoxyethoxy, 1-methoxy-2-methylpropenyloxy, acryloyloxymethoxy, methacryloyloxy(polyethyleneoxy), furyloxy or N-vinylformamido radical and —O—Ph—C(=O)—Ph, —O—C(CF$_3$)=CH—C(=O)—CF$_3$, —O—C(CH$_3$)=CH—C(=O)—CH$_3$, —O—C(CH$_3$)$_2$—CH=CH$_2$, —NH—C(=O)—CH$_3$, —O—C(=O)—CH$_2$Br, —O—C(=O)—CF$_3$, —O—C(=O)—C≡CH or —O—CH$_2$—C(=O)—O—Si(CH$_3$)$_3$.

Component (I) is used preferably in amounts of 0 to 5% by weight, more preferably 0 to 1% by weight, with particular preference 0 to 0.5% by weight. The addition of these compounds may bring about a further improvement in the adhesion to different metals and organic plastics, and also an expansion of the range of materials to which the composition according to the invention adheres.

Preference is given to addition-crosslinking silicone compositions wherein part 1 comprises components A and B and also, if desired, component C, and part 2 comprises components A and D and, if desired, component C, component C possibly being present in both parts but necessarily being present in at least one of the parts. The compounding of the self-adhesive addition-crosslinking silicone compositions is effected by mixing the abovementioned components in any desired sequence. The crosslinking of the self-adhesive addition-crosslinking silicone compositions is preferably effected by heating, preferably at 30 to 250° C., more preferably at at least 50° C., and most preferably at least 100° C., preferably at not more than 200° C., more preferably at not more than 180° C.

The invention further provides addition-crosslinked silicone elastomers based on the composition according to the invention comprising components A, B, C and D. The invention further provides a process for preparing the addition-crosslinked silicone elastomers, in which components A, B, C and D are mixed. The invention further provides a method of joining the addition-crosslinking silicone composition, in which the composition is applied to a substrate and heated.

The addition-crosslinking silicone compositions can be joined to a substrate by applying the silicone compositions to the substrate followed by crosslinking, preferably by heating to 30 to 250° C., to give a composite material. The self-adhesive addition-crosslinking silicone compositions can advantageously be used in particular where good adhesive strength between the addition-crosslinked silicone elastomer and a substrate, preferably a substrate consisting of organic plastics, metals or glasses, is desired. The substrate may be present as a shaped article, film or coating. The self-adhesive addition-crosslinking silicone compositions are suitable for the production of composite material by coating, adhesive bonding or casting and for the production of shaped articles. The self-adhesive addition-crosslinking silicone compositions are particularly suitable for casting and for adhesively bonding electrical and electronic parts and for the production of composite shaped articles. Composite shaped articles are understood here as meaning a uniform shaped article comprising a composite material which is composed of a silicone elastomer part produced from the silicone compositions and of at least one substrate such that there is a strong, permanent bond between the two parts. Such a composite shaped article is preferably produced by processing an organic plastic to give a shaped article and then bringing the silicone compositions into contact with this shaped article and crosslinking them, which can be effected, for example, by the injection molding method, by means of extrusion or in the so-called press-molding method. Composite materials and in particular composite shaped articles can be used in a very wide range of applications, for example in the electronics, household appliances, consumables, construction and automotive industries, in medical technology, in the production of sport and leisure articles, etc.

The outstanding adhesion associated with the self-adhesive addition-crosslinking silicone compositions comes about through the interaction of the three essential components (A), (B) (organohydropolysiloxane) and (C) (adhesion promoter).

In the following examples, unless stated otherwise, all pressures are atmospheric pressure, all temperatures are 20° C., and all parts are by weight.

Base Material 1: (BM 1)

A laboratory kneading apparatus was charged with 255 parts of a vinyldimethylsiloxy-terminated polydimethylsiloxane having a viscosity of 20 Pa·s. This initial charge was heated to 150° C., and 180 parts of a hydrophobic pyrogenic silica having a BET specific surface area of 300 m²/g and a carbon content of 3.95% by weight were added. This produced a highly viscous material which was subsequently diluted with 165 parts of the abovementioned polydimethylsiloxane. Volatile constituents were removed by kneading in vacuo (10 mbar) at 150° C. for one hour. 100 parts of this mixture were mixed on a roll at a temperature of 25° C. with 0.05 part of 1-ethynyl-1-cyclohexanol inhibitor (to prolong the cure time at room temperature) and 10 ppm platinum in the form of a platinum-divinyltetramethyldisiloxane complex in vinyl-terminated polydimethylsiloxane; obtainable from ABCR GmbH & Co., Germany to give a homogeneous material. This base material is identified in Table 1 as "base 1." The other base materials are similarly identified.

Base Material 2: (BM 2)

Base material 2 was prepared as for base material 1 but using, instead of the abovementioned platinum catalyst, 10 ppm platinum in the form of (COD)Pt(p—C≡C—C₆H₅)₂.

Base Material 3: (BM 3)

viscosity measured at 25° C. of 100 mPa·s, are charged to a stirrer. While stirring continues, 1.8 g of phosphonitrilic chloride, prepared according to U.S. Pat. No. 4,203,913, are added at room temperature. After a vacuum of <20 mbar has been applied the mixture is stirred for 5 min, and the vacuum is then broken with $N_2$. Stirring is subsequently carried out at a temperature of 100° C. for 2 h. 14 g of hexamethyldisilazane are added and stirring is continued for 15 min. Finally a vacuum of <10 mbar is applied, the mixture is freed from volatile constituents at 100° C. for 1 h, during which stirring continues, the vacuum is broken with $N_2$, the mixture is cooled to room temperature, and the reaction product is filtered. This gives a trimethylsiloxy-terminal polyorganohydrosiloxane which is composed of —O—Si(Me)₂—, —O—SiH(Me)— and —O—Si(Me)Ph— units in a molar ratio of 15.2:63.0:21.8 and has a viscosity at 25° C. of 32.1 mm2/s. The product contains on average 17 Si—H groups per molecule. This material is identified in Table 1 as "crosslinker 1." Polyorganohydrosiloxanes C2 through C5 are similarly identified.

Polyorganohydrosiloxane 2: (C 2)

5.0 parts of poly[(dimethylsiloxy)bis(dimethylsiloxy)-ethyl-norbornane] were dissolved in 100 parts of toluene and the solution was heated to 80° C. Following the addition of 0.27 part of a 10% strength by weight toluenic solution of PNCl₂, 8.0 parts of poly-methylhydrosiloxane and 4.0 parts of 1,3,5,7-tetra-methylcyclotetrasiloxane, both available commercially from ABCR GmbH, were added dropwise. Removal of volatile constituents gave a colorless liquid which according to its ¹H—NMR, ²⁹Si—NMR and IR spectra had the following average composition, corresponding to an H content (Si—bonded hydrogen) of 0.984% by weight.

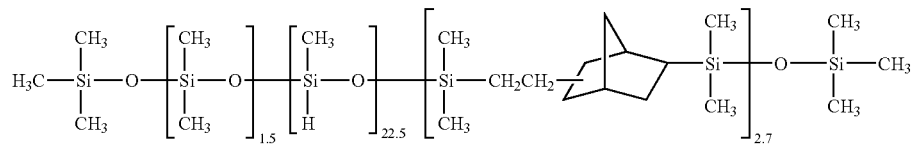

589.4 parts of a vinyldimethylsiloxy-terminated polydimethylsiloxane having a Brabender plasticity of 630 mkp, corresponding to an average molar mass of about 500,000 g/mol, were mixed with 252.6 parts of a hydrophobic pyrogenic silica having a BET specific surface area of 300 m²/g and a carbon content of 3.95% by weight, added in portions in a kneading apparatus over 4 hours to form a homogeneous material. 500 g of the resulting base material were mixed on a roll at a temperature of 20° C. with 0.15 part of 1-ethynyl-1-cyclohexanol inhibitor and 5 ppm platinum in the form of platinum-divinyltetramethyldisiloxane complex in vinyl-terminated polydimethylsiloxane obtainable from ABCR GmbH & Co, Germany, to give a homogeneous material.

Polyorganohydrosiloxane 1: (C 1)

5.0 kg of a trimethylsiloxy-terminal polymethylhydrosiloxane, Me₃Si—(—O—SiH(Me))ₙ—O—SiMe₃, which according to ²⁹Si—NMR has a number-average chain length of n=53, and 5.0 kg of a trimethylsiloxy-terminal siloxane copolymer consisting of dimethylsiloxy and methylphenylsiloxy units in a molar ratio of 15.2:21.8 and having a Polyorganohydrosiloxane 3: (C 3)

20.0 parts of dimethylsiloxane-silphenylene copolymer and 210 parts of toluene (dried) were heated to 80° C. Following the addition of 0.35 part of a 10% strength by weight toluene solution of PNCl₂, 25 parts of polymethylhydrosiloxane (Aldrich GmbH) and 15.0 parts of tetramethylcyclotetrasiloxane were added dropwise over the course of 30 min. The reaction mixture was stirred at 80° C. for 1 hour, and following the addition of a further 0.35 part of a 10% strength by weight toluene solution of PNCl₂, was stirred at a temperature of 100° C. for 1 hour more. After it had cooled, 2.0 parts of hexamethyldisilazane (Aldrich GmbH) were added and stirring was carried out for 30 min. After filtration, the low-boiling constituents were removed in vacuo. This gave a colorless oil which according to the ¹H—NMR, ²⁹Si—NMR and IR spectra had the following average composition: trimethylsiloxy-terminal polyorganohydrosiloxane composed of —O—Si(Me)₂—, —O—SiH (Me)— and —O—Si(Me)₂—Ph—Si(Me)₂—units in a molar ratio of 14.1:77.9:8.0, and containing on average 42

Si—H groups per molecule, corresponding to an H content (Si-bonded hydrogen) of 1.02% by weight.

Comparative Polyorganohydrosiloxane 4: (C 4)

A trimethylsiloxy-terminal polyorganohydro-siloxane containing on average four —O—SiH(Me)— units per molecule, prepared by well known techniques.

Comparative Polyorganohydrosiloxane 5: (C 5)

A trimethylsiloxy-terminal polyorganohydro-siloxane containing on average eight —O—Si(Me)$_2$— and five —O—SiH(Me)— groups, prepared by well known techniques.

Adhesion promoter 1: (AH 1)

2,2-bis(4-allyloxyphenyl)propane. The preparation of the compound per se is known (Sorrell, T. N., Yuan, H., *J. Org. Chem.* 62, (1997) 1899–1902).

Adhesion Promoter 2: (AH 2)

2,2-bis(3-allyl-4-hydroxyphenyl)propane. The compound was obtained from Aldrich GmbH.

Adhesion Promoter 3: (AH 3)

4,4'-dimethylacryloyloxydiphenylmethane. The compound was prepared by the method of Ergozhin et al., *Izv. Akad. Nauk SSSR Ser. Khim.* 24 (1975) 1851.

EXAMPLES

Base material was mixed homogeneously with polyorganohydrosiloxane ("crosslinker") and adhesion promoter (AH) and then degassed in vacuo at room temperature. The proportions of the ingredients are set forth in the table below.

TABLE 1

| Component | Ex. 1 | Ex. 2 | Ex. 3 | Comp. Ex. C4 | Comp. Ex. C5 | Comp. Ex. C6 |
|---|---|---|---|---|---|---|
| Base 1 | 100 | | | 100 | | 100 |
| Base 2 | | 100 | | | 100 | |
| Base 3 | | | 100 | | | |
| Crosslinker 1 | 3.0 | | | | | 3.0 |
| Crosslinker 2 | | 2.7 | | | | |
| Crosslinker 3 | | | 2.6 | | | |
| Crosslinker 4 | | | | 2.4 | | |
| Crosslinker 5 | | | | | 5.3 | |
| Adhesion Promoter 1 | 2.0 | | | 2.0 | | |
| Adhesion Promoter 2 | | 2.0 | | | 2.0 | |
| Adhesion Promoter 3 | | | 2.0 | | | |

The silicone rubber mixtures obtained were subjected to adhesion tests.

Adhesion Characterization

A substrate strip having dimensions 60×20×2 mm is introduced into a stainless steel compression mold and the mold is filled with the addition-crosslinking silicone elastomer material to be tested. The press vulcanization is carried out for 3 min at a temperature of 120° C. and a pressure of 30 metric tons. After removal of the laminate, the rigid substrate element is firmly clamped and the maximum parting force required to detach the adhering silicone elastomer strip in the peel test is determined. The parting force, in nl/mm is determined according to DIN 53531, with the following particulars: the thickness of the support plate was 2 mm and the thickness of the elastomer over the support plate was 4 mm. 10 laminates are measured per example, the parting force is reported as a mean value and the proportion of cohesive failure is reported as a percentage. Cohesive failure of 0% means that the silicone elastomer was detached completely and without residue from the substrate surface. Cohesive failure of 100% means that the delamination took place exclusively by crack growth within the silicone elastomer.

Substrates

The adhesion of the addition-crosslinked silicone elastomers according to the invention and those not according to the invention was tested on the following substrates:

a) polybutylene terephthalate (PBT): Ultradur® B4300G6 (BASF AG; 30% GF)
b) polyamide 6: Durethan® BKV30 (Bayer AG; 30% GF)
c) polycarbonate (PC): Makrolon® (Bayer AG)
d) aluminum (industrial quality; not primed)
e) steel: VA stainless steel (industrial quality)

TABLE 2

(breaking tension in [N/mm]; proportion of cohesive failure in [%])

| Ex. | PBT [N/mm] | [%] | Polyamide6 [N/mm] | [%] | PC [N/mm] | [%] | Aluminum [N/mm] | Steel [N/mm] | [%] |
|---|---|---|---|---|---|---|---|---|---|
| 1 | 14.8 | 100 | 11.0 | 40 | 15.8 | 100 | 10.0 | 14.4 | 100 |
| 2 | 12.3 | 100 | 10.6 | 30 | 13.9 | 100 | 10.5 | 15.0 | 100 |
| 3 | 11.8 | 100 | 9.3 | 30 | 12.5 | 80 | 8.9 | 12.8 | 100 |
| C4 | 7.1 | 20 | 4.4 | 0 | 7.4 | 20 | 3.2 | 3.8 | 50 |
| C5 | 1.2 | 0 | — | — | 1.0 | 0 | 1.9 | 2.1 | 20 |
| C6 | 1.6 | 0 | — | — | 0.8 | 0 | 2.2 | 1.8 | 10 |

The values shown in Table 2 demonstrate the high adhesive strength between the inventive addition-crosslinked silicone elastomers (Examples 1, 2 and 3) and various organic plastics and metals. As is evident from Comparative Examples C4 and C5, high adhesive strength is not achieved by the presence of the crosslinker component unless the base component is one according to the invention. As is evident from Example 6, high adhesive strength is also not achieved not by the base component alone, even with an adhesion promoter, but only in conjunction with a crosslinker component according to the invention. This is evidence of a synergistic effect of the adhesion-promoting components and of the silicone composition according to the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An addition-crosslinking silicone composition comprising
   (A) at least one diorganopolysiloxane of the formula (1)

$$R^1{}_aR^2{}_bSiO_{(4-a-b)/2} \quad (1),$$

in which
   $R^1$ is a hydroxyl radical or a monovalent, optionally halogen-substituted $C_{1-20}$ hydrocarbon radical optionally containing O, N, S or P atoms, and being free of aliphatically unsaturated groups,
   $R^2$ is a monovalent, aliphatically unsaturated, optionally halogen-substituted $C_{1-10}$ hydrocarbon radical optionally containing O, N, S or P atoms,

15 a has a value from 1.0 to 2.0, b is from 0.0003 to 2, with the proviso that 1.5<(a+b)<3.0, that on average at least two aliphatically unsaturated radicals $R^2$ are present per molecule, and that the viscosity of the diorganopolysiloxane(s) (A) is 1 mPa·s to 40,000 Pa·s, determined at 25° C., (B) organohydropolysiloxanes of the general formula (2)

 (2), in which $R^3$ is a monovalent aliphatically saturated $C_{1-20}$ hydrocarbon radical, $R^4$ is (a) an optionally halogen-substituted monovalent $C_{6-15}$ hydrocarbon radical which contains at least one aromatic $C_6$ ring, or (b) a halogen-substituted, saturated monovalent $C_{2-20}$ hydrocarbon radical optionally containing O, N, S or P atoms, $R^5$ is a bivalent, optionally halogen-substituted $C_{6-20}$ hydrocarbon radical Si-bonded at both ends, optionally containing O, N, S or P atoms, c, d, e and f are independently zero or a non-zero number, with the proviso that the organohydropolysiloxane (B) contains on average at least 3 SiH groups per molecule, that the relationship: 0.05<100 (d+e)/(c+d+e+f) is fulfilled, and that the viscosity of the organohydropolysiloxane (B) is 1 mPa·s to 100 Pa·s determined at 25° C., (C) adhesion promoters

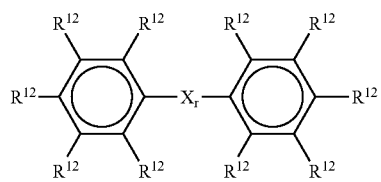 (6)

in which each $R^{12}$ independently is a hydrogen atom, a hydroxyl group, a halogen atom, an alkyl, alkenyl, alkoxy, alkenyloxy or aryl group, or a monovalent organic group containing an alkenyl, alkoxy, glycidyl, carbonyl, carbonyloxy, silyloxy or alkoxysilyl group, at least one of the radicals $R^{12}$ being an alkenyl group or a monovalent organic group containing an alkenyl group, and X is selected from the following groups:

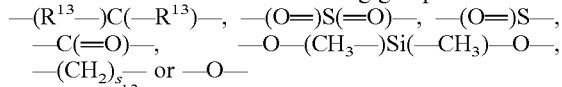

in which $R^{13}$ is a hydrogen atom, a halogen atom or a substituted or unsubstituted alkyl, aryl, alkenyl or alkynyl group and s is a positive number of at least 2, and r is 0 or 1, and (D) a hydrosilylation catalyst.

2. The composition of claim 1 wherein $R^5$ is selected from the group consisting of norbornylene, cyclohexylene, phenylene, and mixtures thereof.

16

3. The composition of claim 1, wherein the organohydropolysiloxane (B) is a linear polysiloxane containing from 5 to about 40 SiH units.

4. The composition of claim 1, wherein said organohydropolysiloxane (B) is terminated with trimethylsiloxy groups.

5. The composition of claim 1, wherein the adhesion promoter (C) is selected from the group consisting of:

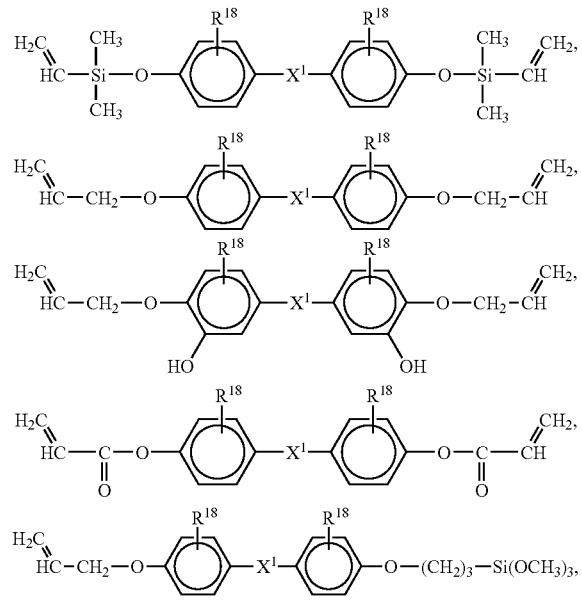

and mixtures thereof.

6. The addition-crosslinking silicone composition of claim 1, which is a two part composition, wherein part 1 comprises components A and B and optionally C, and part 2 comprises components A and D and optionally C, C optionally being present in both part 1 and part 2 but necessarily being present in at least one of part 1 or part 2.

7. An addition-crosslinked silicone elastomer obtained by curing the composition of claim 1.

8. An addition-crosslinked silicone elastomer obtained by curing the composition of claim 2.

9. An addition-crosslinked silicone elastomer obtained by curing the composition of claim 3.

10. An addition-crosslinked silicone elastomer obtained by curing the composition of claim 4.

11. An addition-crosslinked silicone elastomer obtained by curing the composition of claim 5.

* * * * *

UNITED STATES PATENT AND TRADEMARK OFFICE
CERTIFICATE OF CORRECTION

PATENT NO. : 7,119,159 B2
APPLICATION NO. : 10/456710
DATED : October 10, 2006
INVENTOR(S) : Armin Fehn et al.

It is certified that error appears in the above-identified patent and that said Letters Patent is hereby corrected as shown below:

Column 15, Line 19, Claim 1:

Delete "optionally containing O, N, S or P atoms".

Column 15, Line 26, Claim 1:

After "25°C, and" insert

--wherein the organohydropolysiloxanes of the formula (2) contain at least one $R_2SiO_{2/2}$ moiety where R is selected from $R^3$ and $R^4$, where at least one $R^5$ is present, and wherein the organohydropolysiloxanes of the formula (B) contain at least 5 Si-H units,--

Signed and Sealed this

Twelfth Day of June, 2007

JON W. DUDAS
*Director of the United States Patent and Trademark Office*